(12) United States Patent
Lusen et al.

(10) Patent No.: US 7,003,529 B2
(45) Date of Patent: Feb. 21, 2006

(54) SYSTEM FOR ADAPTIVELY IDENTIFYING DATA FOR STORAGE

(75) Inventors: William D. Lusen, Ambler, PA (US); Bruce M. Flamma, Phoenixville, PA (US); Frank W. Racis, Spring City, PA (US)

(73) Assignee: Siemens Medical Solutions Health Services Corporation, Malvern, PA (US)

( * ) Notice: Subject to any disclaimer, the term of this patent is extended or adjusted under 35 U.S.C. 154(b) by 546 days.

(21) Appl. No.: 10/236,511

(22) Filed: Sep. 6, 2002

(65) Prior Publication Data
US 2003/0050937 A1    Mar. 13, 2003

Related U.S. Application Data

(60) Provisional application No. 60/318,128, filed on Sep. 8, 2001.

(51) Int. Cl.
*G06F 17/30* (2006.01)

(52) U.S. Cl. .......................... 707/104.1; 707/3; 707/200

(58) Field of Classification Search ............. 707/1–10, 707/200, 205, 104.1, 203; 705/2, 3; 719/328
See application file for complete search history.

(56) References Cited

U.S. PATENT DOCUMENTS

| | | |
|---|---|---|
| 4,008,956 A | 2/1977 | Stemmle |
| 4,396,903 A | 8/1983 | Habicht et al. ................. 382/9 |
| 4,714,995 A | 12/1987 | Materna et al. .............. 364/200 |
| 5,070,531 A | 12/1991 | Schuerman et al. |
| 5,170,466 A | 12/1992 | Rogan et al. ................. 395/145 |
| 5,245,441 A | 9/1993 | Ruben .......................... 358/426 |
| 5,321,816 A | 6/1994 | Rogan et al. ................ 395/200 |
| 5,550,976 A | 8/1996 | Henderson et al. ..... 395/200.06 |
| 5,608,541 A | 3/1997 | Yamada |
| 5,659,164 A | 8/1997 | Schmid et al. |
| 5,659,746 A | 8/1997 | Bankert et al. .............. 395/621 |
| 5,682,444 A | 10/1997 | Reasoner, Jr. et al. ....... 382/306 |
| 5,950,214 A | 9/1999 | Rivette et al. .............. 707/512 |
| 6,023,715 A | 2/2000 | Burkes et al. |
| 6,122,684 A | 9/2000 | Sakura |
| 6,181,837 B1 | 1/2001 | Cahill et al. ................. 382/305 |
| 6,192,165 B1 | 2/2001 | Irons ........................... 382/306 |
| 6,236,994 B1 | 5/2001 | Swartz et al. ................... 707/6 |
| 6,243,753 B1 | 6/2001 | Machin et al. .............. 709/227 |
| 6,401,138 B1 * | 6/2002 | Judge et al. ................. 719/328 |

(Continued)

FOREIGN PATENT DOCUMENTS

EP    1 117 975 A1    7/2001

(Continued)

*Primary Examiner*—Frantz Coby
*Assistant Examiner*—Marc R. Filipczyk
(74) *Attorney, Agent, or Firm*—Alexander J Burke ESQ

(57) ABSTRACT

The invention is directed to a system for adaptively identifying data to be stored in a document-processing system that includes an identification processor programmed for identifying the existence of a new and previously absent stored data object in at least one of a plurality of file directories. The identified new stored data object being associated with a particular medical entity, a decision processor programmed for comparing at least a portion of a filename of an identified new stored data object with stored predetermined filename data, and identifying a new stored data object containing data indexing information in response to a filename data match. A communication processor is programmed for providing communication among the identification processor, the decision processor and the document-processing system for processing an identified new stored data object containing data indexing information differently from other identified new stored data objects.

13 Claims, 4 Drawing Sheets

U.S. PATENT DOCUMENTS

| | | |
|---|---|---|
| 6,427,032 B1 | 7/2002 | Irons et al. ................. 382/306 |
| 6,442,748 B1 | 8/2002 | Bowman-Amuah ............ 717/3 |
| 6,457,017 B1 | 9/2002 | Watkins et al. |
| 6,507,849 B1 * | 1/2003 | Choudhary ............. 707/103 Y |
| 6,594,650 B1 * | 7/2003 | Hasuo et al. .................. 707/2 |
| 6,606,637 B1 | 8/2003 | Hill et al. |
| 6,829,611 B1 * | 12/2004 | Majewski et al. ............ 707/10 |
| 6,883,144 B1 * | 4/2005 | Zielinski et al. ............ 715/765 |
| 2002/0065848 A1 | 5/2002 | Walker et al. |
| 2002/0083079 A1 | 6/2002 | Meier et al. |
| 2002/0111960 A1 | 8/2002 | Irons et al. ................. 707/204 |
| 2003/0074248 A1 * | 4/2003 | Braud et al. .................... 705/9 |

FOREIGN PATENT DOCUMENTS

| | | |
|---|---|---|
| WO | WO 01/65354 A1 | 9/2001 |
| WO | WO 02/17136 A1 | 2/2002 |

* cited by examiner

SYSTEM FOR ADAPTIVELY IDENTIFYING DATA FOR STORAGE

This is a non-provisional application of provisional application Ser. No. 60/318,128 by W. Lusen et al. filed Sep. 8, 2001.

FIELD OF THE INVENTION

The present invention is related to a computerized system for adaptively identifying data to be stored in a document-imaging system. More particularly, the present invention is related to a computerized system that identifies new data objects and data indexing information and routes them differently based on whether they need to be stored in or processed by the document-imaging system.

BACKGROUND

Document-imaging systems are often used as a platform for the management of healthcare related documents and the integration of multimedia content in a client server environment. Such systems require tools for applications to acquire, store, organize, display and manage multimedia content (including traditional reports, images, voice, video, etc.). They also require an adequate mechanism to share multimedia content with all healthcare applications regardless of where the content originated. Any application that generates binary output, such as electronic documents or reports, may choose to send this output to the document-imaging platform via several standard integration interfaces exposed by the document imaging system. Unfortunately, however, there are many applications that do not perform this explicit integration. This creates problems in acquiring objects from these non-integrated applications into the document-imaging platform.

Accordingly, a system is needed that is capable of acquiring objects without the need for a tight integration with the systems that create those objects.

SUMMARY OF THE INVENTION

The invention is directed to a system for adaptively identifying data to be stored in a document-imaging system that includes an identification processor programmed for identifying the existence of a new and previously absent stored data object in at least one of a plurality of file directories, the identified new stored data object being associated with a particular medical entity, a decision processor programmed for identifying a new stored data object containing received data indexing information generated in response to a filename data match; and a communication processor programmed for providing communication among the identification processor, the decision processor and the document-imaging system for processing the identified new stored data object containing data indexing information differently from other identified new stored data objects.

DETAILED DESCRIPTION

The invention will be understood more fully from the detailed description given below and from the accompanying drawings of the preferred embodiments of the invention; which, however, should not be taken to limit the invention to a specific embodiment but are for explanation and understanding only.

The document-imaging system within which the present invention is to be used stores multimedia content in the form of documents. A document in this context is preferably a single, self-contained, data object that is comprised one or more objects. Each object is typically a single binary file. Objects are typically text reports, scanned images, word processing documents, or any other binary data generated by any application.

The document-imaging system organizes documents by filing them hierarchically into folders using a relational database. A folder in this context is simply a virtual container for a set of documents that "belong" to a specific owner. This is analogous to a typical manila folder in a filing cabinet. Similarly, filing a document into a folder is analogous to inserting a paper document into a manila folder. An "owner" is a set of indexes that uniquely identify a specific person, organization, or entity. For example, a patient is a potential "owner" of documents relating to that patient's health care record.

Figure 1:
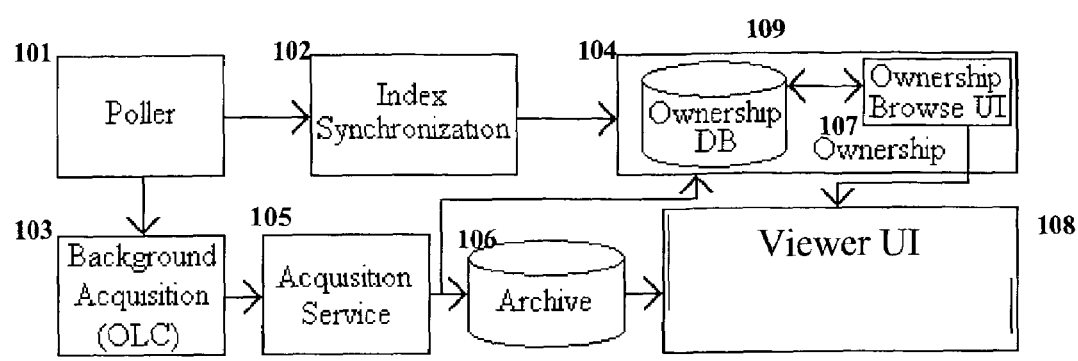
FIG. 1 is a diagram illustrating an overview of a document-imaging system incorporating the storage management system of the invention.

FIG. 1 illustrates a high-level overview of the functionally active components of a document-imaging system incorporating the present invention. The arrows show, in the simplest terms, how the active components relate to each other. Specifically, poller (101) detects new files to be stored or processed by the document-imaging system, and feeds them to index synchronization component (102) and/or to background acquisition component (103) depending on their contents. Index synchronization component (102) takes batched or real-time indexing information, for example, from data repository or database (109) containing a master patient index, interprets the indexing information, and passes it to ownership component (104) to create and/or update folder information.

Background acquisition component (103) processes files to be stored in the document-imaging system by breaking them apart into documents and extracting indexing information for them. These documents and their indexing information are then passed to acquisition service (105). Acquisition service (105) gathers new documents and their indexing information and routes them to storage manager (106) and to ownership component (104) so they are properly stored and associated with the correct folders. Storage manager (106) stores objects, organizes them into documents, and provides hierarchical storage management for the objects.

Ownership component (104) organizes documents by maintaining indexing information in the form of folders and also maintaining the list of documents in each folder within database (109). Ownership also preferably includes browser user interface (107), which is programmed to display, navigate, and maintain the hierarchy of folders and a summary of their contents. Browser user interface (107) is also preferably programmed to enable the display of selected documents by feeding them to the viewer user interface (108). Viewer user interface (108) renders document objects to an output device such as a screen or printer and allows navigation across multiple documents.

This document-imaging system thus preferably utilizes three types of data interfaces that are programmed to communicate with external applications to integrate multimedia content into their workflows and business processes. The interoperable user interfaces provide robust user forms (such as HTML or XML generated user input forms) that external applications may embed within their own user interface as a tightly integrated part of the application workflows. These forms relieve the application of the burden of understanding and formatting the complex multimedia information presented by the document-imaging system. Service level application interfaces use conventional data streams that represent the information stored in the document imaging system and to allow the system to intermix multimedia information with other data in the application. The background data exchange interfaces are programmed to provide communication points between the document-imaging system and an external application to share information therebetween. These interfaces are typically used by the document-imaging system to accept index information or to automatically acquire new documents.

The document imaging system preferably operates on a Microsoft Windows 2000 or Windows NT Server, although it is not limited thereto, and is described in that implementation herein. In this context, the present invention, as described in more detail below, preferably executes as a Windows Service and can be controlled using the Windows Service Manager, which is accessible through the Windows "Services" Administrative Tool. The software components of the document imaging system are preferably built as system services.

The present invention is directed to the polling component of the above-described document-imaging system, which adaptively identifies and routes the data objects for storage or processing in the document-imaging system. The invention provides a data processing mechanism by which the electronic documents (e.g., images, text reports, XML data streams, word processing documents, publishing format documents, encoded data, or any other binary object) may be stored and indexed in the document-imaging platform, without implementing tight integration with the applications generating these objects. The data processor accomplishes this by gathering the objects and calling the conventional document imaging integration interfaces associated with the document-imaging platform on behalf of the non-integrated applications. This allows the document-imaging platform to acquire objects generated by other software applications without requiring those applications to call the integration interfaces explicitly, enables identified data objects to be executed by different applications. Thus, a first executable application may process one identified data object and another identified data object may be processed by a different second executable application.

This communication between the data processor, the other components of the document-imaging system, and the external applications may be accomplished using any number of well known conventional means, such as standard Microsoft Windows file and folder sharing, industry standard File Transfer Protocol mechanisms, and/or industry standard Hyper Text Transfer Protocol mechanisms.

The data processor is programmed to identify the objects that need to be collected/stored/archived/indexed and may launch the proper services within the document-imaging platform that will perform the work required to store and index these objects. The data processor is also programmed to identify objects that contain indexing information and pass those objects to the proper document-imaging processes that will use them to update indexing information in the document-imaging platform.

Figure 2:
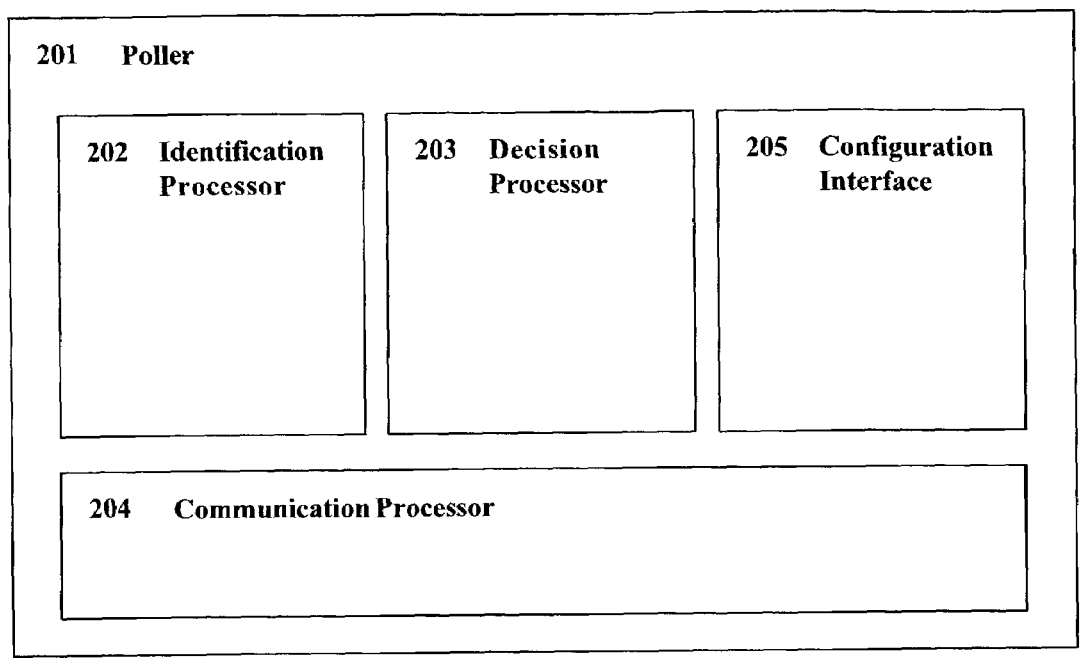
FIG. 2 is a diagram illustrating the preferred embodiment of the invention.

An example of the elements of the software component of the data processor is shown in FIG. 2. As shown in FIG. 2, the data processor, poller (201), includes an identification processor (202) programmed for identifying existence of a new and previously absent stored data object in at least one of a plurality of file directories, the identified new stored data object being associated with a particular medical entity, (such as a hospital, a physician group, a clinic, a healthcare payer institution, a healthcare provider institution, a hospital department, etc.) a decision processor (203) programmed for comparing at least a portion of a filename of an identified new stored data object with stored predetermined filename data and identifying a new stored data object containing data indexing information in response to a filename data match, and communication processor (204) programmed for providing communication among the identification processor, the decision processor and the document-imaging system for processing an identified new stored data object containing data indexing information differently from other identified new stored data objects.

Identification processor (202) preferably identifies the existence of a new and previously absent stored data objects in at least one of a plurality of file directories by receiving an alert indicating a new data object has been stored in a file directory; and intermittently polling file directories to determine if there is a new stored data object addition to a directory. Identification processor (202) may intermittently poll a file directory upon expiration of a predetermined file directory inactivity time interval.

The data processor further includes programming for configuration user interface (205), which allows an administrator to configure, maintain, and operate the data processor. The operation of each of these components is described in more detail below.

The data processor monitors one or more specified directories for new files that may be processed by the document-imaging system. The data processor preferably waits to be alerted by the operating environment that new files have appeared and/or by actively querying the resources for files that may have appeared. The manner in which such communication with the Windows operating system may be accomplished, such as through the use of API's and the like, is well known to those of ordinary skill in the art and will not be further elaborated upon here. Configuration parameters within the programming of the system of the data processor may be used to specify the resources to be monitored and the frequency of performing the active query.

Once a file has been discovered by the data processor through its communication with the operating system, the data processor is programmed to pass information for this file to the correct service for processing. The data processor is also programmed to provide that service with any initial values and processing parameters it expects. There are preferably two services to process new files: a post stream service exposed by background acquisition component (103) and a batch transaction processing service exposed by index synchronization (102).

The data processor feeds data to the processes provided by both background acquisition component (103) and index synchronization component (102). For example, the data processor may feed data for new reports to be processed by background acquisition component (103) and it may feed data for batch indexing files to index synchronization component (102).

The system resources monitored by the data processor may be used to pass this information. In turn, data processor is programmed to communicate with the external applications using a wide variety of resources through which the external applications may send data objects to the document-imaging system. These may include, but are not limited to, the use of File Transfer Protocol ("FTP"), or the use of an operating system dependent protocol through a pre-specified network share. In this second example, any output may then be acquired by the data processor is it is saved to a network share configured for use by background acquisition component (103). The data processor simply monitors this directory for any new objects and passes them to background acquisition component (103) as they appear.

These documents are acquired in files that have been placed in file system folders accessible by the data processor and the document-imaging platform. The data processor locates the documents, identifies them (such as by determining the report name and a host/region location code, discussed in more detail below), moves them to a central location, and notifies background acquisition component (103) that the document is available for processing.

The data processor and background acquisition component (103) are preferably run asynchronously to allow the data processor to process information as quickly as possible. The data processor, or background acquisition component (103), thus also preferably includes a means to queue up notifications so that the data processor and background acquisition component (103) need not be synchronized. Once queued, a notification should preferably have persistence. In other words, it should survive any unexpected shutdown of the data processor, background acquisition component (103), or the entire system. Moreover, if background acquisition component (103) encounters an error while processing a document, there should be a means of resubmitting the notification. The data processor preferably uses a conventional HTTP Post interface to send notifications to background acquisition component (103) that a document is available for processing. The data processor and background acquisition component (103) preferably use a database management system and activity log to provide this functionality.

As noted above, the software component of the data processor is preferably built as an NT service. When the service is started, it queries the configuration user interface (205) for a list of customers. For each customer on the list, the data processor queries configuration interface (205) to get a list of environments supported for that customer. Finally, the set of operating parameters for each environment are obtained from configuration interface (205). Once the data processor has all of its operating parameters, it creates processes to service each environment.

The data processor is also programmed to retrieve a list of customers; and, for each customer, a list of environments. The data processor stores and retrieves configuration information for each customer/environment combination. The type of data the data processor may store is not particularly limited, and may include, for example, a list of folders to monitor, default entity identifier (such as a hospital/region code), and processing flags.

The data processor then preferably uses Windows system services in a conventional manner to wait efficiently for a file to be placed in a designated input folder by an external system. When the notification arrives from the Windows system service, all files in the folder are preferably identified and copied, and a notice is sent to background acquisition component (103).

In order to identify an object for processing by the document-imaging system, the data processor preferably first recognizes that an object exists by responding to events logged on the Microsoft Windows based file system. The data processor monitors one or more specified directories (file folders), by using standard Windows programming interfaces; and Windows alerts the data processor when new objects have arrived in one or more of those directories. The data processor will also actively search for objects in those directories after a time period of no activity has passed (this time period is configurable).

The data processor then preferably distinguishes the type of an object. Once the data processor has recognized that an object exists, it should determine whether the object should be acquired (stored/indexed) or processed for index information. The data processor preferably accomplishes this by using the object's file name. The file name is compared with a configurable, pre-determined pattern using configuration interface (205), such as by character string matching, and a match with the pattern indicates the object contains index information. Otherwise the object will be acquired and stored.

When the data processor has identified an object that should be acquired, it calls the document-imaging service to process the file. If the call is successful, the data processor is finished with the object. Otherwise it will retry the call periodically until it is successful. When the data processor has identified an object that should be acquired that contains indexing information, it calls a service within the document-imaging platform to index and process the file that is programmed for this type of file. If the call is successful, the data processor is finished with the object, otherwise it will retry the call periodically until it is successful. In accomplishing the above task, the system of the data processor identifies these objects and passes them to other components of the document-imaging platform. The data processor itself preferably does not process these objects in any way.

The document-imaging system has the ability to recover from errors. Typically, an error the data processor will encounter during normal processing is a failure when trying to call the document imaging services that accept and process the files identified by the data processor. The data processor recovers from these errors by re-attempting the call either after a pre-configured idle period has passed or at such time as a new file arrives for processing. In other words, identification process (202) is further programmed to detect failure of at least one operation selected from the group consisting of (a) processing of an identified new stored data object containing data indexing information and (b) acquisition of other identified new stored data objects for storage; and scheduling said operation to be retried.

Configuration Interface (205) is preferably programmed to allow for the configuration of the system resources being monitored, and to allow for the creation, viewing, and modification of the list of resources to be monitored. It is also preferably programmed to allow for the configuration of the criteria used to identify the file data for processing, and to allow the administrator to add, revise, and/or delete the programming based rules used by the data processor to decide which service should be used to process a file. These criteria may include, for example, the file directories and/or network shares that will be monitored, the environment of the document-imaging system to which the data will be sent, and the entity or organization associated with the resources.

Access to this utility is preferably controlled by conventional security protocols and systems, e.g., conventional user name/password restrictions and system based file access and ownership rights.

The management functionality of configuration interface (205) allows an installer and/or administrator of the software to specify configuration information for the data processor. It also allows a system operator to monitor and control the status of the instances of the data processor operating on the computer system.

In a preferred embodiment, this interface consists of two sets of functionality between the administrator and the data processor. The first is the installation/configuration, which allows an installer or operator to change the configuration of the data processor. When the user is finished changing the configuration, a message is sent to the data processor in a conventional manner, causing it to shut down and restart processing for the selected customer. The other is management, which allows an operator to monitor the status of the data processor for a selected customer, stop or start the data processor as needed.

Configuration interface (205) collects information for each customer/environment combination. These include, for example, the source folder for the data object, the target folder, the minimum allowable disk blocks on target disk, the designated folder for backup of source files, an on/off switch for backup processing, an on/off switch for the data processor itself, a default hospital/region code, and an internal flag to create target subfolder name from file name for the document to be processed. When configuration information is changed, a message is sent to the operating data processor process (if any). The data processor shuts down after the current file is processed and restarts with the new configuration.

Configuration interface (205) displays information for the selected customer. This includes, for example, defined environments and the data processor status for each. The status is not particularly limited, but preferably includes enabled/disabled, running/stopped flags, numbers of errors encountered, a list of the last 10 files processed, and a list of the last 10 errors encountered. Configuration interface (205) preferably gives the user the following controls over the data processor operation: start/stop the processing of a source folder, start/stop processing for an environment, and start/stop processing for a customer.

The document-imaging system and the data processor support multiple customers in a single computing environment (server or cluster of servers). For each customer, multiple versions of the document-imaging system are supported. For example, a customer may want to install a new version of document-imaging system in a training environment while continuing to run the current version in a production environment. Many instances of the data processor may thus be executed simultaneously on a single server. Each instance of the data processor preferably identifies objects to be processed for a single facility (e.g., a hospital, a physician group, a clinic, etc.) within a single document-imaging "environment" (defined in this context as a single database/archive with a single, related web-application for a single customer enterprise).

Figure 3:
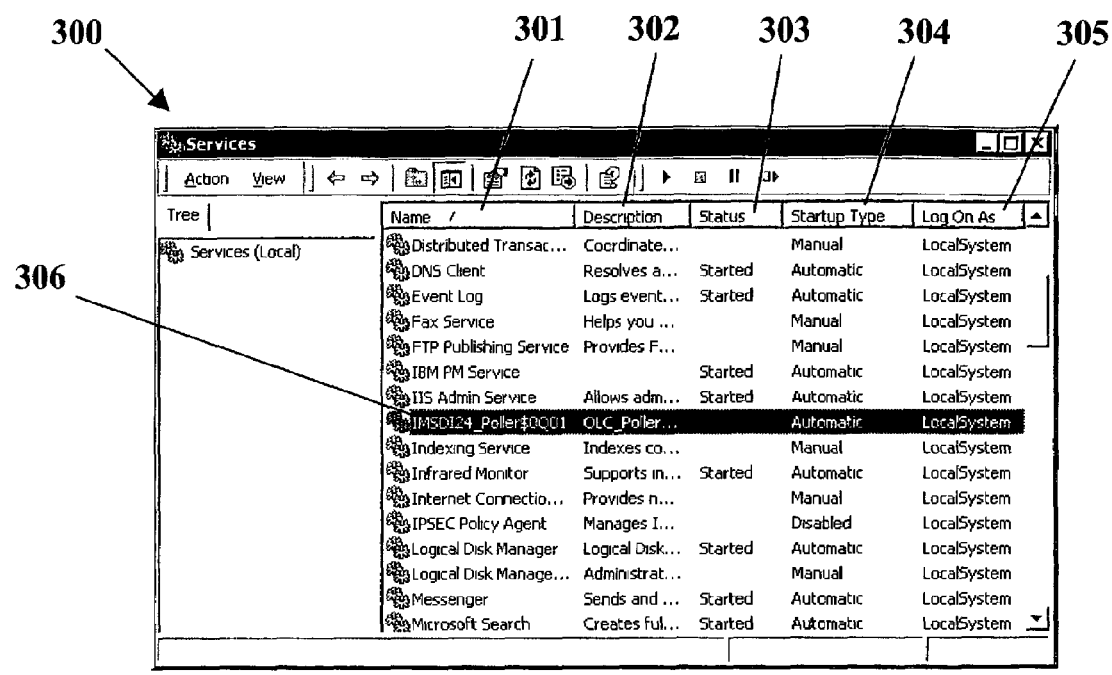
FIG. 3 is a computer screenshot of a service instance of the invention operating in the Microsoft Windows 2000 environment.

For example, FIG. 3 illustrates an data processor instance of the data processor operating as a Windows 2000 service for a "0Q01" facility (a.k.a. organization) in the "DI24", environment. As shown in FIG. 3, the Windows 2000 services window (300) includes a list of services organized by name (301), description (302), status (303), startup type (304), and log on (305). The name of the service instance for the data processor (306) preferably includes the organizations and the environment. Those of ordinary skill in the art will appreciate that while the naming standard chosen for this example for these services is: IMS<env>_Poller$<org>, it is not limited thereto.

Figure 4:
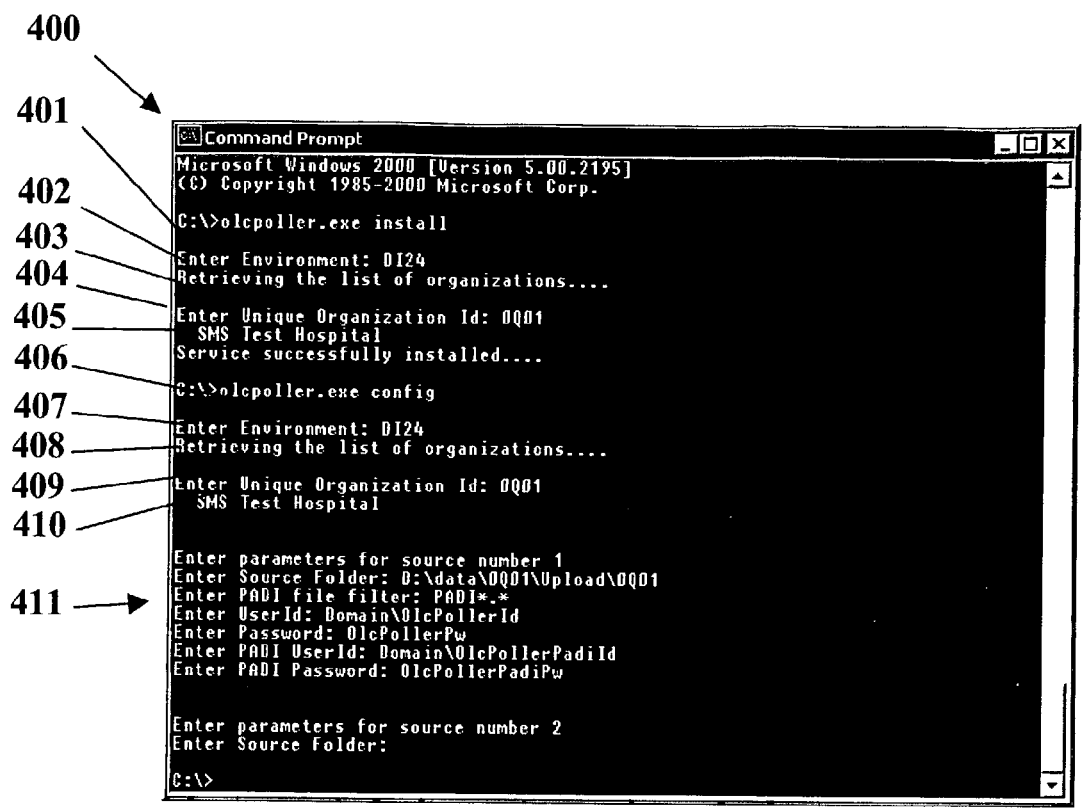
FIG. 4 is a computer screenshot of a command line interface screen in accordance with the invention.

FIG. 4 illustrates a series of command line instructions to configure this example of the data processor for the "0Q01" facility (a.k.a. organization) in the "DI24" environment using a command line display screen to access the installation and management of configuration interface (205). As shown in FIG. 4, command line display screen (400) provides command prompt (401), at which the user enters the file name of the executable file to install the data processor on the system, followed by the "install" parameter. This file then executes and prompts the name of the environment for this instance of the data processor (402). The data processor then retrieves the appropriate list of organizations (403), and prompts the user for the unique organization Id (404). The user enters this Id and the system identifies the organization (405). The data processor also confirms that the service instance for this organization has successfully been installed.

Similarly, to configure this instance of the data processor, the user may enter the executable file followed by the "config" parameter at command prompt (406). The data processor then prompts the user for the environment (407), and retrieves the list of organizations (408), based upon what the user enters. The system prompts the user for the organization Id (409), and identifies the organization (410) based upon what the user enters. The data processor then prompts the user for a series of configuration parameters (411), which it stores for use in the system in the manner described above.

Although this invention has been described with reference to particular embodiments, it will be appreciated that many variations will be resorted to without departing from the spirit and scope of this invention as set forth in the appended claims. For example, the terms "computer", "computer system", or "server" as used herein should be broadly construed to include any device capable of receiving, transmitting and/or using information including, without limitation, a processor, microprocessor or similar device, a personal computer, such as a laptop, palm PC, desktop, workstation, or word processor, a network server, a mainframe, an electronic wired or wireless device, such as for example, a telephone, an interactive television, such as for example, a television adapted to be connected to the Internet or an electronic device adapted for use with a television, a cellular telephone, a personal digital assistant, an electronic pager, a digital watch and the like. Further, a computer, computer system, or system of the invention may operate in communication with other systems over a communication network, such as, for example, the Internet, an intranet, or an extranet, or may operate as a stand-alone system.

What is claimed is:

1. A system for adaptively identifying data to be stored in a document processing system comprising:

an identification processor for automatically intermittently examining a plurality of file directories to identify a plurality of new stored data objects within at least one of said plurality of file directories, said identified new stored data objects being associated with a particular medical entity and having been previously absent from said at least one of said plurality of file directories;

a decision processor for identifying a particular new stored data object of said plurality of new stored data objects based on predetermined object identification criteria, said particular new stored data object containing associated data indexing information; and a communication processor for providing communication among said identification processor, said decision processor and said document processing system for processing said identified particular new stored data object containing data indexing information with a first executable application differently from other identified new stored data objects without data indexing information using a different second executable application, by automatically deriving data index information from said particular new stored data object in response to said identification of said particular new stored data object.

2. A system according to claim 1, wherein said predetermined object identification criteria comprises a filename and said decision processor identifies a new stored data object based on a filename match; and said particular medical entity includes one or more selected from the group consisting of (a) a hospital, (b) a physician group, (c) a clinic, (d) a healthcare payer institution, (e) a healthcare provider institution, and (f) a hospital department.

3. A system according to claim 1, wherein said document processing system processes said other identified new stored data objects for storage in a data repository associated with said particular medical entity.

4. A system according to claim 1, wherein said identification processor identifies existence of a new and previously absent stored data object in at least one of a plurality of file directories by:

receiving an alert indicating a new data object has been stored in a file directory; and intermittently polling file directories to determine if there is a new stored data object addition to a directory.

5. A system according to claim 4, wherein said identification processor intermittently polls a file directory upon expiration of a predetermined file directory inactivity time interval.

6. A system according to claim 1, wherein said communication processor further:

detects failure of at least one operation selected from the group consisting of (a) processing of an identified new stored data object containing data indexing information and (b) acquisition of other identified new stored data objects for storage; and schedules said operation to be retried.

7. A system according to claim 1, further comprising a configuration interface enabling a user to install, configure, and operate said identification processor, said indexing processor, and said communication processor.

8. A method performed by a data processor for adaptively identifying data to be stored in a document processing system comprising the steps of:

automatically intermittently interrogating a plurality of file directories to identify a plurality of newly stored data objects in at least one of said plurality of file directories, said plurality of newly stored data objects being associated with a particular medical entity and having individual filenames;

receiving data indexing information associated with a particular one of said identified plurality of newly stored data objects identified in response to a filename data match for said particular one of said plurality of newly stored data objects; and communicating at least a portion of said received data indexing information to said document processing system for use in processing of said particular one of said identified plurality of newly stored data objects with a first executable application using said associated data indexing information, and differently from other identified newly stored data objects without data indexing information using a different second executable application, by automatically deriving data index information from said particular new stored data object in response to identification of said particular new stored data object.

9. The method of claim 8, wherein said particular medical entity includes one or more selected from the group consisting of (a) a hospital, (b) a physician group, (c) a clinic, (d) a healthcare payer institution, (e) a healthcare provider institution, and (f) a hospital department.

10. The method of claim 8, wherein said document processing system processes said other identified newly stored data objects in a repository associated with said particular medical entity.

11. The method of claim 8, wherein said identification of said plurality of newly stored data objects occurs after the additional steps of:

receiving an alert indicating a new data object has been stored in a file directory; and intermittently polling file directories to determine if there is a new stored data object addition to a directory.

12. The method of claim 11, wherein said step of intermittently polling said file directory occurs upon expiration of a predetermined file directory inactivity time interval.

13. The method of claim 8, further comprising the steps of:

detecting failure of at least one operation selected from the group consisting of (a) processing of an identified one of said plurality of newly stored data objects using said data indexing information and (b) acquisition of other identified newly stored data objects; and scheduling said operation to be retried.

\* \* \* \* \*